(12) United States Patent
Genov et al.

(10) Patent No.: US 6,489,741 B1
(45) Date of Patent: Dec. 3, 2002

(54) ROBOT MOTION COMPENSATION SYSTEM

(75) Inventors: Genco Genov, deceased, late of San Jose, CA (US), by Mila Genov, legal representative; Zlatko M. Sotirov, Sunnyvale, CA (US); Eugene Bonev, Santa Clara, CA (US)

(73) Assignee: Genmark Automation, Inc., Sunnyvale, CA (US)

( * ) Notice: Subject to any disclaimer, the term of this patent is extended or adjusted under 35 U.S.C. 154(b) by 0 days.

(21) Appl. No.: 09/635,732

(22) Filed: Aug. 9, 2000

Related U.S. Application Data (63) Continuation-in-part of application No. 09/139,882, filed on Aug. 25, 1998, now abandoned.

(51) Int. Cl.[7] .............................................. G05B 13/00
(52) U.S. Cl. ...................... 318/561; 318/562; 318/563; 318/564; 318/565; 318/566; 318/568.1; 318/568.11; 318/568.12; 318/568.13; 318/568.14; 318/568.15; 318/568.16; 318/568.17; 318/568.2; 318/568.21
(58) Field of Search ................................ 318/561–568, 318/574, 569

(56) References Cited

U.S. PATENT DOCUMENTS

| | | | |
|---|---|---|---|
| 3,240,513 A | 3/1966 | Turzillo | 285/90 X |
| 3,805,629 A | 4/1974 | Martin et al. | 74/89.15 |
| 3,920,972 A | 11/1975 | Corwin, Jr. et al. | 235/151.11 |
| 3,968,885 A | 7/1976 | Hassan et al. | 214/1 BC |
| 4,166,543 A | 9/1979 | Dahlstrom | 414/749 |
| 4,181,465 A | 1/1980 | Ridderström | 414/590 |
| 4,196,049 A | 4/1980 | Burns et al. | 176/19 R |
| 4,260,941 A | 4/1981 | Engelberger et al. | 318/562 |
| 4,299,533 A | 11/1981 | Ohnaka | 414/752 |
| 4,433,382 A | 2/1984 | Cunningham et al. | 364/474 |
| 4,457,664 A | 7/1984 | Judell et al. | 414/779 |
| 4,465,424 A | 8/1984 | Inaba et al. | 414/589 |
| 4,466,307 A | 8/1984 | Kouno | 74/479 |
| 4,488,242 A | 12/1984 | Tabata et al. | 364/513 |
| 4,501,527 A | 2/1985 | Jacoby et al. | 414/225 |
| 4,502,830 A | 3/1985 | Inaba et al. | 414/735 |

(List continued on next page.)

FOREIGN PATENT DOCUMENTS

| | | |
|---|---|---|
| EP | 132 538 | 5/1984 |
| EP | 410 823 | 5/1990 |
| GB | 2 120 202 | 4/1983 |
| JP | 61-273441 | 12/1986 |
| JP | 62-130938 | 6/1987 |
| JP | 64-69487 | 3/1989 |
| JP | 1-316184 | 12/1989 |
| RU | 1668784 | 4/1989 |

OTHER PUBLICATIONS

Kensington Laboratories, Inc. advertising brochure dated Jul. 20, 1993 (Semicon West trade show).

*Primary Examiner*—Robert E. Nappi
*Assistant Examiner*—Tyrone Smith
(74) *Attorney, Agent, or Firm*—Thelen Reid & Priest LLP; Robert E. Krebs (57) ABSTRACT

Motion of a substrate-transporting robot arm is controlled in order to compensate for inaccuracies and deflections encountered during operation. The compensation is effected by synchronizing elevational and planar motions of the robot arm such that the trajectory of the substrate is made coincident with the object axis of the substrate. The substrate may be a semiconductor wafer, an LCD panel or an end effector of the robot arm. The synchronized motion is achieved using a controller issuing control signals to arm actuating means based on synchronization algorithms developed during analytical or experimental robot learning sessions.

12 Claims, 7 Drawing Sheets

U.S. PATENT DOCUMENTS

| | | | |
|---|---|---|---|
| 4,511,985 A | 4/1985 | Inaba et al. | 344/513 |
| 4,566,847 A | 1/1986 | Maeda et al. | 414/744 R |
| 4,664,587 A | 5/1987 | Case, Jr. et al. | 414/680 |
| 4,680,802 A | 7/1987 | Nishida et al. | 382/8 |
| 4,686,866 A | 8/1987 | Rosheim | 414/225 |
| 4,693,629 A | 9/1987 | Bruinsma | 403/170 |
| 4,706,000 A | 11/1987 | Kishi et al. | 318/568 |
| 4,732,525 A | 3/1988 | Neumann | 414/729 |
| 4,735,539 A | 4/1988 | Häkkinen et al. | 414/281 |
| 4,746,256 A | 5/1988 | Boyle et al. | 414/217 |
| 4,762,459 A | 8/1988 | Morita et al. | 414/680 |
| 4,766,322 A | 8/1988 | Hashimoto et al. | 250/561 |
| 4,770,590 A | 9/1988 | Hugues et al. | 414/172 |
| 4,782,713 A | 11/1988 | Torii et al. | 74/89.15 |
| RE32,794 E | 12/1988 | Engelberger et al. | 414/730 |
| 4,794,513 A | 12/1988 | Müller | 318/568 |
| 4,795,957 A | 1/1989 | MacNeal, Jr. et al. | 318/568 |
| 4,808,059 A | 2/1989 | Eddy | 414/416 |
| 4,808,064 A | 2/1989 | Bartholet | 414/730 |
| 4,846,626 A | 7/1989 | Engelbrecht | 414/754 |
| 4,897,015 A | 1/1990 | Abbe et al. | 414/744.8 |
| 4,907,035 A | 3/1990 | Galburt et al. | 356/150 |
| 4,921,395 A | 5/1990 | Sahlin | 414/744.3 |
| 4,928,245 A | 5/1990 | Moy et al. | 364/513 |
| 4,951,601 A | 8/1990 | Maydan et al. | 118/719 |
| 4,961,267 A | 10/1990 | Herzog | 33/503 |
| 5,007,784 A | 4/1991 | Genov et al. | 414/225 |
| 5,017,075 A | 5/1991 | Block | 414/225 |
| 5,053,687 A | 10/1991 | Merlet | 318/568.2 |
| 5,064,160 A | 11/1991 | Brumby | 248/316.5 |
| 5,064,340 A | 11/1991 | Genov et al. | 414/744.5 |
| 5,099,707 A | 3/1992 | Tori et al. | 74/89.15 |
| 5,102,280 A | 4/1992 | Poduje et al. | 414/225 |
| 5,107,716 A | 4/1992 | Torii et al. | 74/89.15 |
| 5,109,724 A | 5/1992 | Delarue et al. | 74/479 |
| 5,116,190 A | 5/1992 | Silke | 414/735 |
| 5,157,315 A | 10/1992 | Miyake et al. | 318/568.11 |
| 5,178,512 A | 1/1993 | Skrobak | 414/744.5 |
| 5,202,716 A | 4/1993 | Tateyama et al. | 354/319 |
| 5,220,849 A | 6/1993 | Lande et al. | 74/479 |
| 5,234,303 A | 8/1993 | Koyano | 414/217 |
| 5,278,494 A | 1/1994 | Obigane | 324/158 F |
| 5,438,647 A | 8/1995 | Nagamatsu et al. | 395/82 |
| 5,445,491 A | 8/1995 | Nakagawa et al. | 414/786 |
| 5,571,325 A | 11/1996 | Ueyama et al. | 118/320 |
| 5,604,443 A | 2/1997 | Kitamura et al. | 324/754 |
| 5,604,677 A | 2/1997 | Brien | 364/474.28 |
| 5,775,170 A | 7/1998 | Genov et al. | 74/490.04 |
| 5,789,890 A * | 8/1998 | Genov et al. | 318/567 |
| 5,852,413 A * | 12/1998 | Bacchi et al. | 341/13 |
| 5,907,229 A * | 5/1999 | Snell | 318/569 |
| 6,037,733 A | 3/2000 | Genov et al. | 318/568.11 |
| 6,092,004 A * | 7/2000 | Harima | 700/252 |
| 6,101,057 A * | 8/2000 | Kartchner et al. | 360/69 |
| 6,120,433 A * | 9/2000 | Mizuno et al. | 600/102 |
| 6,126,381 A * | 10/2000 | Bacchi et al. | 414/754 |
| 6,184,868 B1 * | 2/2001 | Shahoian et al. | 345/161 |

* cited by examiner

ROBOT MOTION COMPENSATION SYSTEM

This application is a continuation-in-part of U.S. patent application Ser. No. 09/139,882, filed on Aug. 25, 1998, now abandoned and claims priority under 35 U.S.C. §§120 and/or 363 to this application.

BACKGROUND OF THE INVENTION

1. Field of the Invention

The invention relates to substrate handling robots.

2. Description of Related Art

In the semiconductor and other industries, robots are called upon to perform a variety of tasks requiring high repeatability and precision. For example, in semiconductor wafer processing, cassettes containing a plurality of semiconductor wafers are loaded and unloaded into a micro-environment in which the wafers are to undergo processing. The loading and unloading functions involve automated motions performed by a robot, also serving to variously transport the wafers between different processing stations in the micro-environment. Such a robot is disclosed in co-pending U.S. patent application Ser. No. 09/079,850, entitled "Robot Having Multiple Degrees of Freedom", incorporated herein by reference in its entirety.

Figure 1:
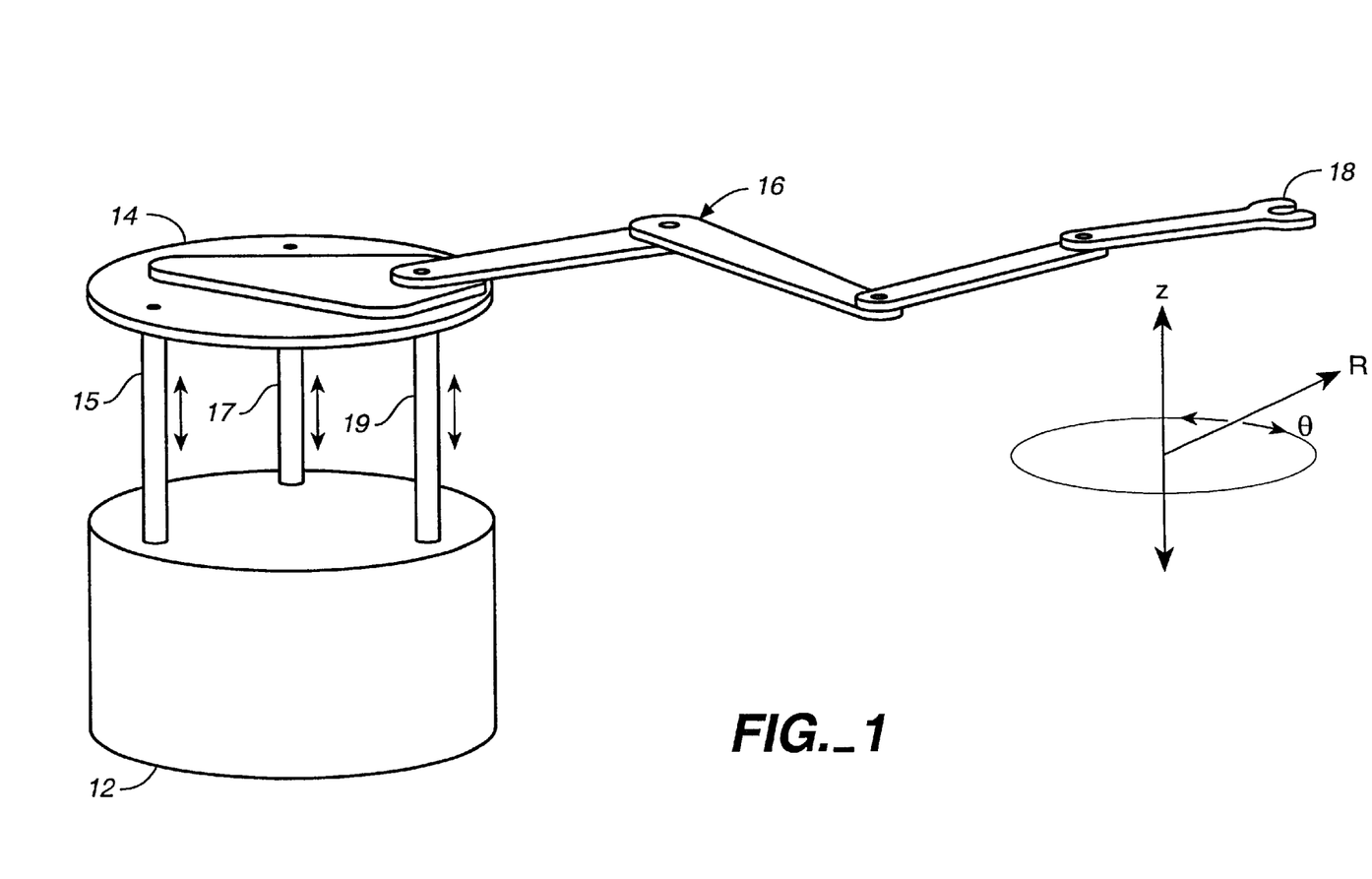
FIG. 1 is a schematic illustration of a GPR robot.

The robot in the aforementioned patent application is of the type known as a Global Positioning Robot (GPR) and, as seen in FIG. 1, comprises a base unit 12 having one or more telescoping platforms 14 atop of which is mounted a robot arm 16 with an end effector 18 for handling the substrates. The telescoping motion constitutes motion in the Z axis, with the robot further adapted to tilt about the Z axis. Tilting is effected by independently actuating Z motion along means such as motors (not shown). Other tilting mechanisms are also known and may be used to effect the tilting along the Z axis.

The robot arm 16 is additionally capable of motion in a plane defined by R and θ coordinates in a conventional cylindrical coordinate system such that the end effector 18 can move anywhere about a predetermined region in the plane, taking a variety of possible paths including both linear and non-linear paths. This motion is effected using appropriate actuation means such as motors and associated belt-pulley linkages (not shown) as described in the aforementioned patent application. Other motions include yaw and roll motion of the end effector 18, permitting the robot to achieve six or more degrees of freedom and possibly kinematic redundancy. The actuation means are controlled using a suitable control means such as a microprocessor adapted to issue the appropriate commands to achieve the desired motion trajectories.

The amount of precision which can be realized in robotic applications is dependent upon various factors and is limited by for example the geometry and stiffness of the moving components such as the robot arm. The weight of the substrate being manipulated by the robot also imparts certain deflections on the system, and with the advance of the semiconductor and LCD technology fields requiring the handling of larger and larger substrates, this factor becomes increasingly significant. As the substrate is transported between different positions by the robot, deviations from the intended path inevitably occur, compromising the accuracy of the system and imposing undesirable constraints, such as for example the need to increase spacing between the wafers in a cassette in order to accommodate expected deviations. Problems can thus arise due to inaccuracies or deflection of the robot arm, deflection of the end effector of the robot arm or of the manipulated substrate, or to misalignment of the substrate and/or cassette.

Figure 2A:
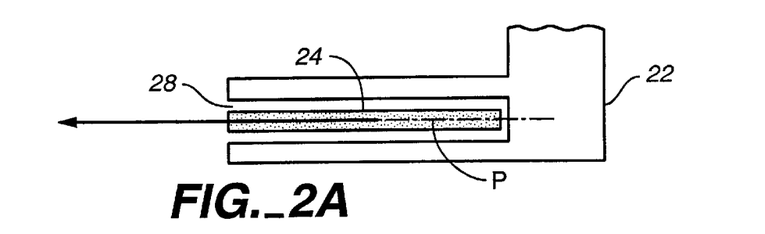
FIGS. 2A and 2B are schematic illustrations of an ideal substrate retraction situation.
Figure 2B:
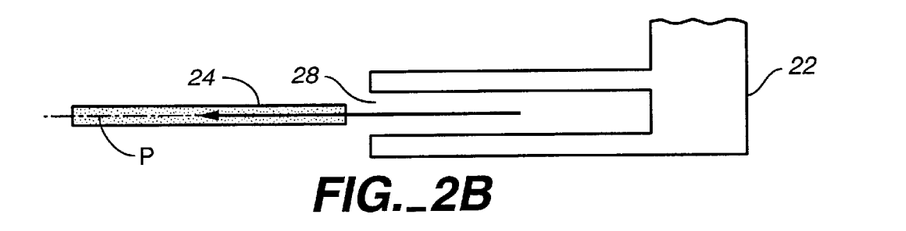

To better explain the problems encountered, an ideal situation will first be discussed. FIG. 2A shows the ideal case in which the substrate, in this case a semiconductor wafer 24 having a substantially planar shape and an object axis P lying in its primary plane, is centered within its designated slot 28 in cassette 22. The orientation of the wafer 24 and the orientation of the slot 28 are identical. The robot arm (not shown) is assumed to be perfectly manufactured and therefore the wafer 24 remains in the same plane during its transport to and from slot 28. Since the plane of motion of wafer 24, depicted in FIG. 2B, is coincident with the plane of the wafer itself (and more particularly with the object axis P) and the plane of the slot 28, no obstructions in the travel path are encountered and motion of the wafer 24 between the approach position and the pickup position is unhampered. For clarity, the approach position is defined with respect to the cassette and is to be understood as the position at which the end effector and/or end effector-wafer combination approach or retract from the cassette, while the pickup position is defined with respect to the wafer itself and is the position at which the end effector is just about to engage or disengage from the wafer.

Figure 3A:
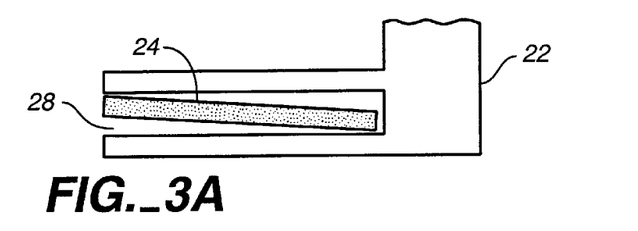
FIGS. 3A–3C are schematic illustrations of a first non-ideal situation encountered in practice.
Figure 3B:
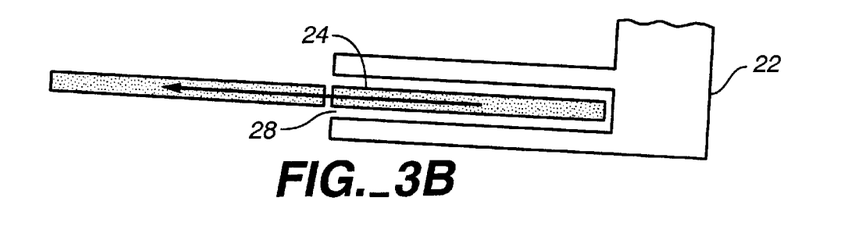
Figure 3C:
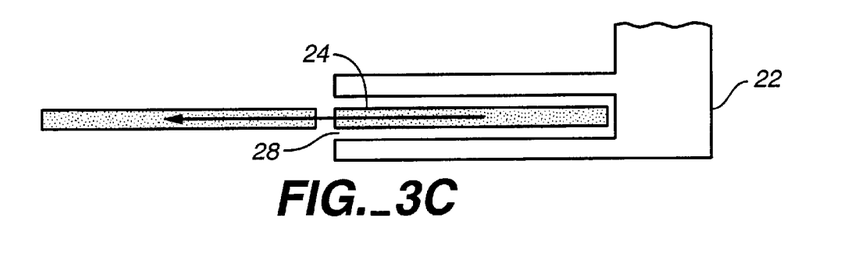

In a first non-ideal situation encountered in practice and depicted in FIG. 3A, the orientation of the wafer 24 is different from that of slot 28 which it occupies, with object axis P being transverse to the axis of the slot 28. Since the wafer 24 cannot be withdrawn from the cassette 22 in this transverse position, either the cassette 22 must be rotated while the orientation of the wafer 24 is maintained until parallelism of the two is achieved (FIG. 3B), or the robot itself must be rotated while supporting wafer 24 (FIG. 3C). The rotation of the cassette is a disruptive intervention which must be performed manually and detracts from system throughput and efficiency, while rotation of the wafer-end effector combination can only be performed using GPR-type robots.

Figure 4A:
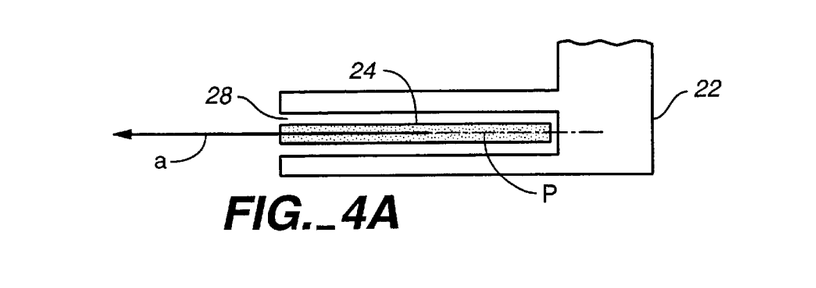
FIGS. 4A and 4B are schematic illustrations of a second non-ideal situation encountered in practice.
Figure 4B:
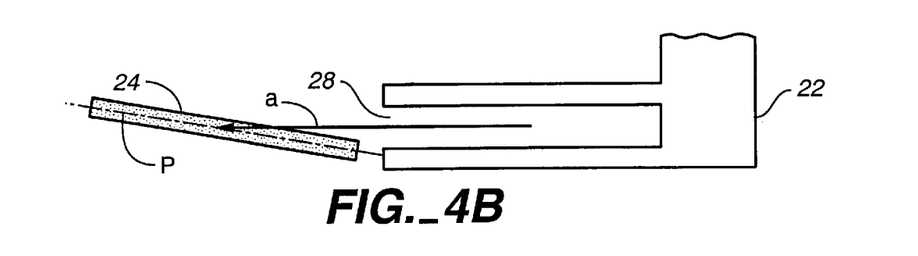

A worse situation, depicted in FIGS. 4A and 4B, occurs when the wafer 24, initially properly aligned within slot 28 (FIG. 4A), changes its orientation and vertical position during motion due to for example geometric inaccuracies of the arm. Equally undesirable is for the wafer 24 to approach the slot 28 in the displaced orientation and vertical position during the reverse, insertion process into the cassette 22. A manifestation of this is the tilt of object axis P with respect to the direction of motion a such that the orientation of wafer 24 is transverse to the direction of motion a.

Figure 6A:
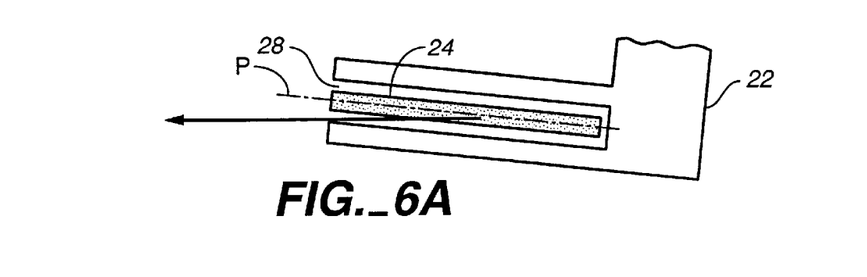
FIGS. 6A–6C are schematic illustrations describing the non-ideal situations in which object shadows are created.
Figure 6B:
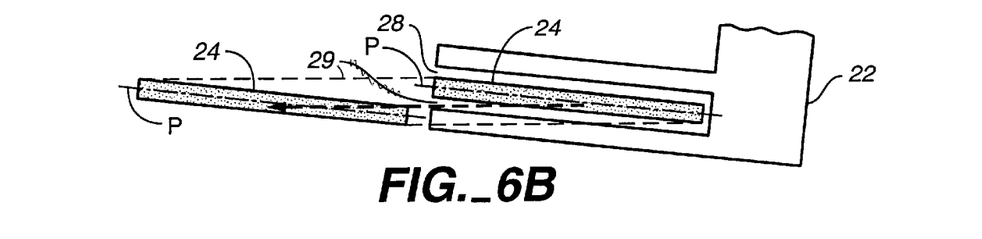
Figure 6C:
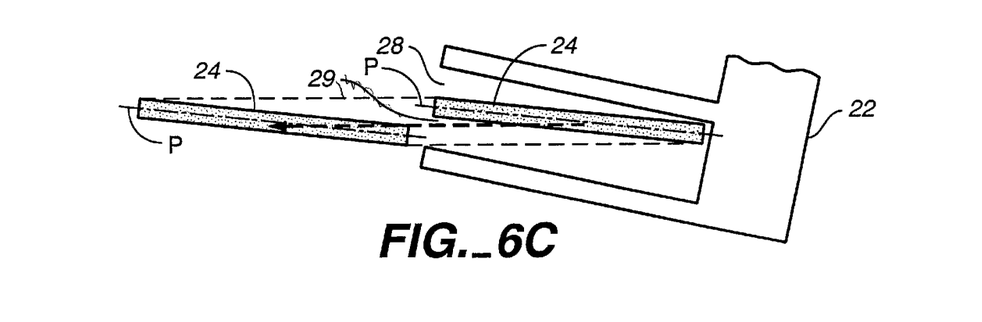

FIGS. 6A–6C show the motion of a semiconductor wafer 24 during retraction from a slot 28 of a misaligned cassette 22. As can be seen from the drawing figure, because the direction of motion of wafer 24 is not coincident with object axis P of wafer 24, an object shadow 29 is created which the wafer 24, over the course of the transport duration, necessarily occupies. This object shadow 29 exceeds the slot width shown in FIGS. 6A and 6B and imposes the requirement of an expanded width on slot 28 as shown in FIG. 6C in order to permit unobstructed retraction or insertion of the wafer 24 into the cassette 22. Accordingly, wafer pitch and cassette capacity are reduced.

Conventional non-GPR robots cannot obviate this situation because they are unable to change the orientation of the end effector about its longitudinal axis and because they lack adequate algorithmic resources to implement the necessary combination of motions. GPR robots, on the other hand, can compensate for the undesirable deviations because these robots can for example be tilted along the Z axis, as shown in FIG. 5.

Figure 5:
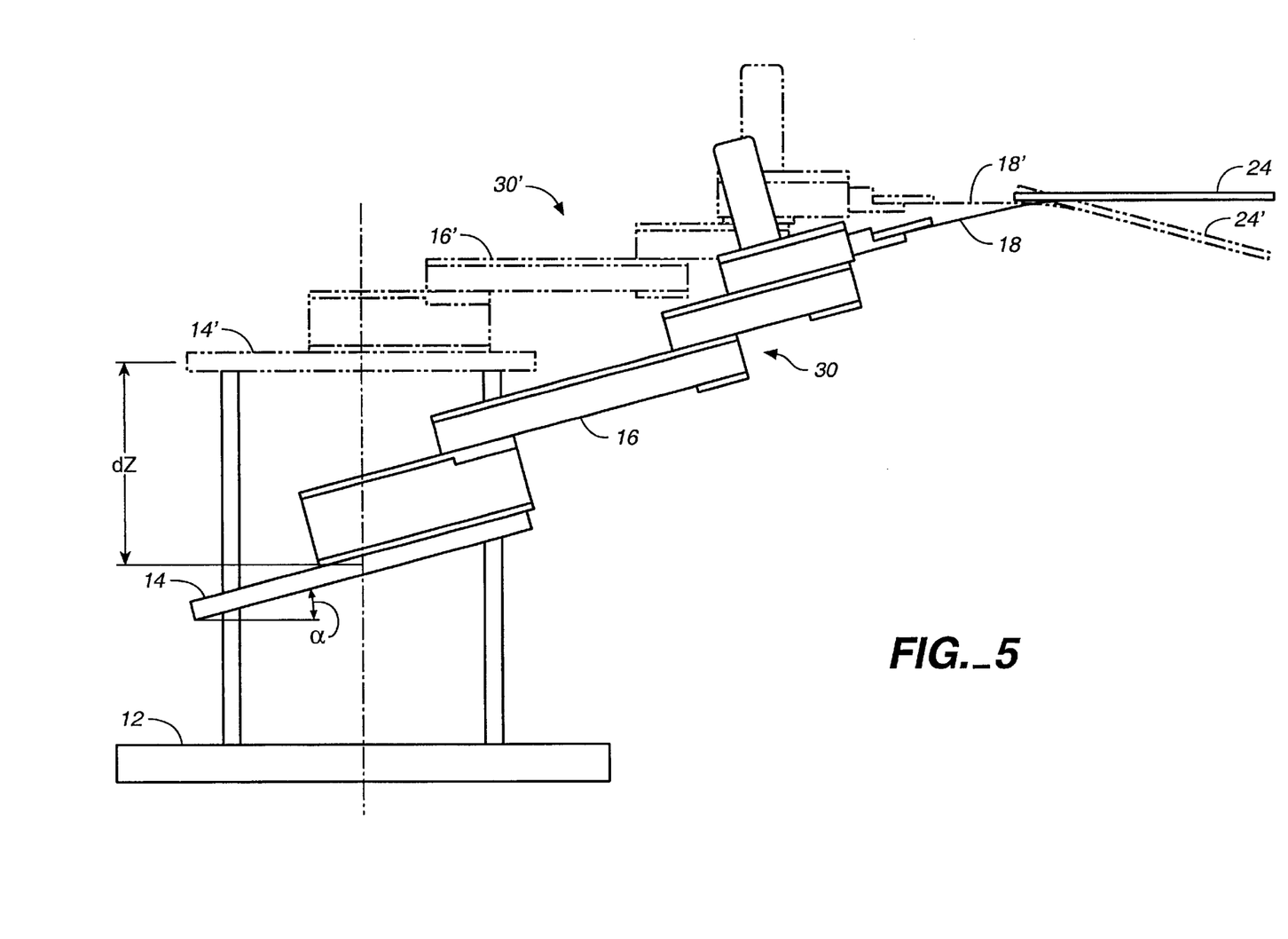
FIG. 5 is a schematic illustration a compensated and an uncompensated configuration of a GPR robot.

FIG. 5 schematically shows two positions of a wafer-carrying GPR robot: compensated position 30 and uncompensated position 30'. The compensation in this case is effected in order to maintain a horizontal position of the wafer 24, although other positions can of course also be achieved. As can be seen, in the uncompensated position 30', with the arm 16' extended, the position of the end effector 18' and the wafer 24' deviate from the horizontal, exhibiting a sag due to for example the weight of wafer 24', arm 16' and end effector 18', and to the geometry and stiffness of arm 16' and end effector 18'. In order to compensate for this deviation, platform 14 is tilted a predetermined angle α and lowered an amount dZ while arm 16 is extended by a predetermined amount. The resultant tilt re-aligns wafer 24 to a horizontal orientation.

Because the above situations are encountered in practice, it is desirable to control robot motion such that the robot arm is made to counter-act anticipated deflections and deviations from its intended path. In such a manner greater precision and substrate pitch are achieved and process throughput improved.

SUMMARY OF THE INVENTION

The present invention overcomes the deficiencies of the prior art by actively compensating for deviations in the travel path of the robot arm. In accordance with the invention, the velocity components of robot arm motion are synchronized during extension and retraction of the robot arm to thereby compensate for mechanical and other imperfections, as well as other imperfections of the arm and the manipulated object, which would otherwise cause deviations from an ideal path.

In accordance with the preferred embodiment, motion of the robot arm in the Z direction is synchronized with the planar motion of the robot arm such that the trajectory of the transported object, which may be the end effector of the robot arm itself, is along an object axis of the object. The synchronization may be a linear interpolation between the approach and pickup positions of the robot in terms of the end-effector coordinates. The effects of robot arm position deviation due to for example the weight of the substrate is canceled by applying a predetermined motion algorithm taking into account the position of the robot arm-object combination as well as their weight, along with other factors impacting the accuracy of the object manipulation process.

GPRs (Global Positioning Robots) are particularly well-suited to minimize such deviations because their triple actuated Z axis provides stronger support to the upper mechanical structure and because their kinematic versatility enables adjustment of the orientation of the platform of the GPR and the end effector to the orientation of the cassettes without affecting the characteristic point (center) of the manipulated substrate. In accordance with the invention, the dexterity of GPRs is exploited with synchronous movement of the platform during transition between the approach and pickup positions of the end effector associated with a cassette or another substrate holder.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DESCRIPTION OF THE PREFERRED EMBODIMENTS

Figure 7:
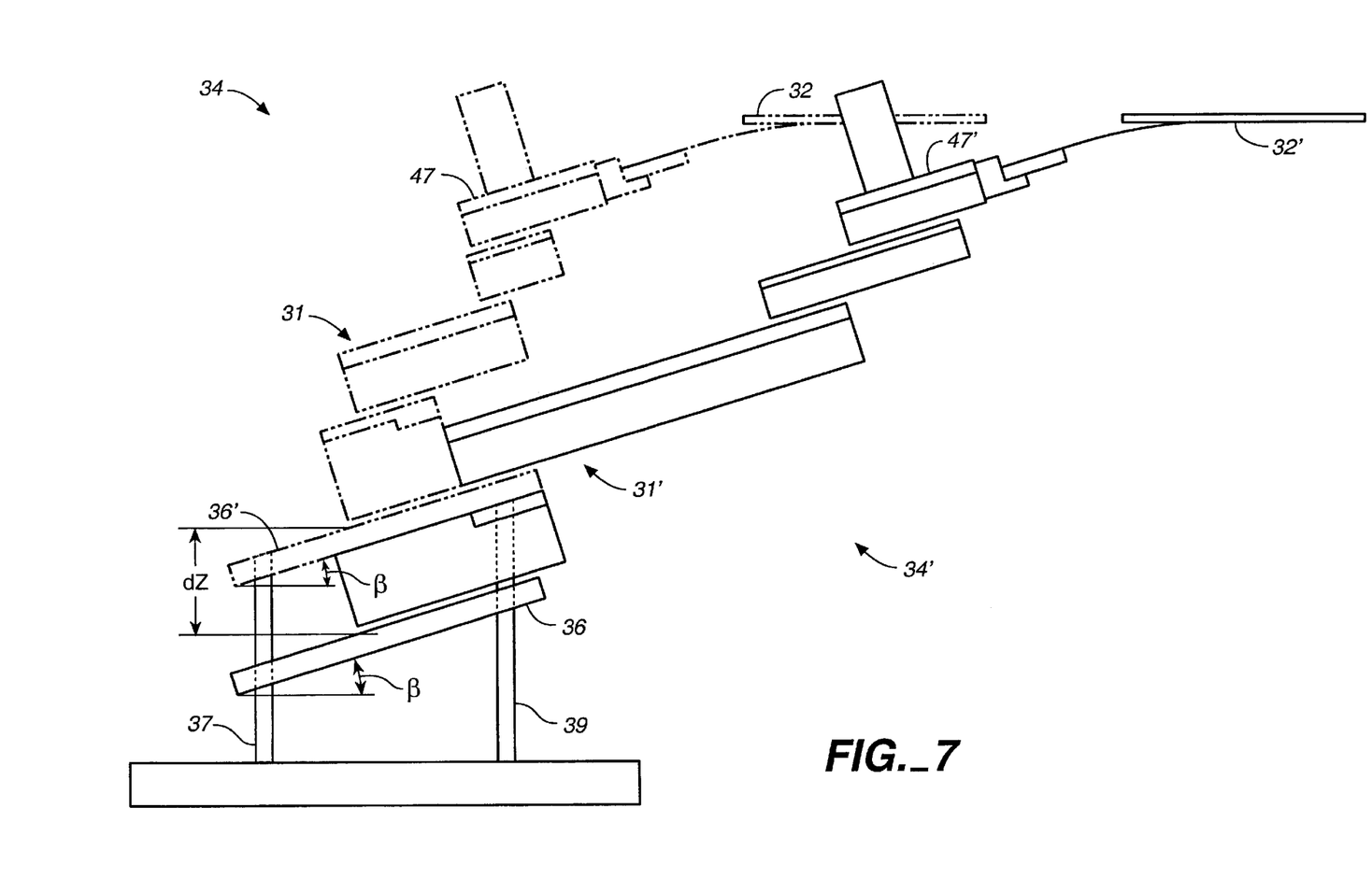
FIG. 7 is a schematic illustration of a GPR robot in the approach and pickup positions.

FIG. 7 schematically shows two positions of a substrate-carrying GPR: approach position 31 and pick up position 31'. In operation, arm 34 reciprocates between these two positions during operation of the robot, such as for example to approach a substrate-carrying cassette (not shown) and pickup the substrate 32 therefrom, or to deliver the substrate 32 from another region in the system back to the cassette. It is to be understood that the term substrate includes for example semiconductor wafers and LCD panels. Additionally, the method of the invention as described below can be applied to the motion of any object, including the end effector itself regardless of whether it is transporting a substrate, such that difficulties associated with the accurate motion of the object can be obviated.

Figure 8:
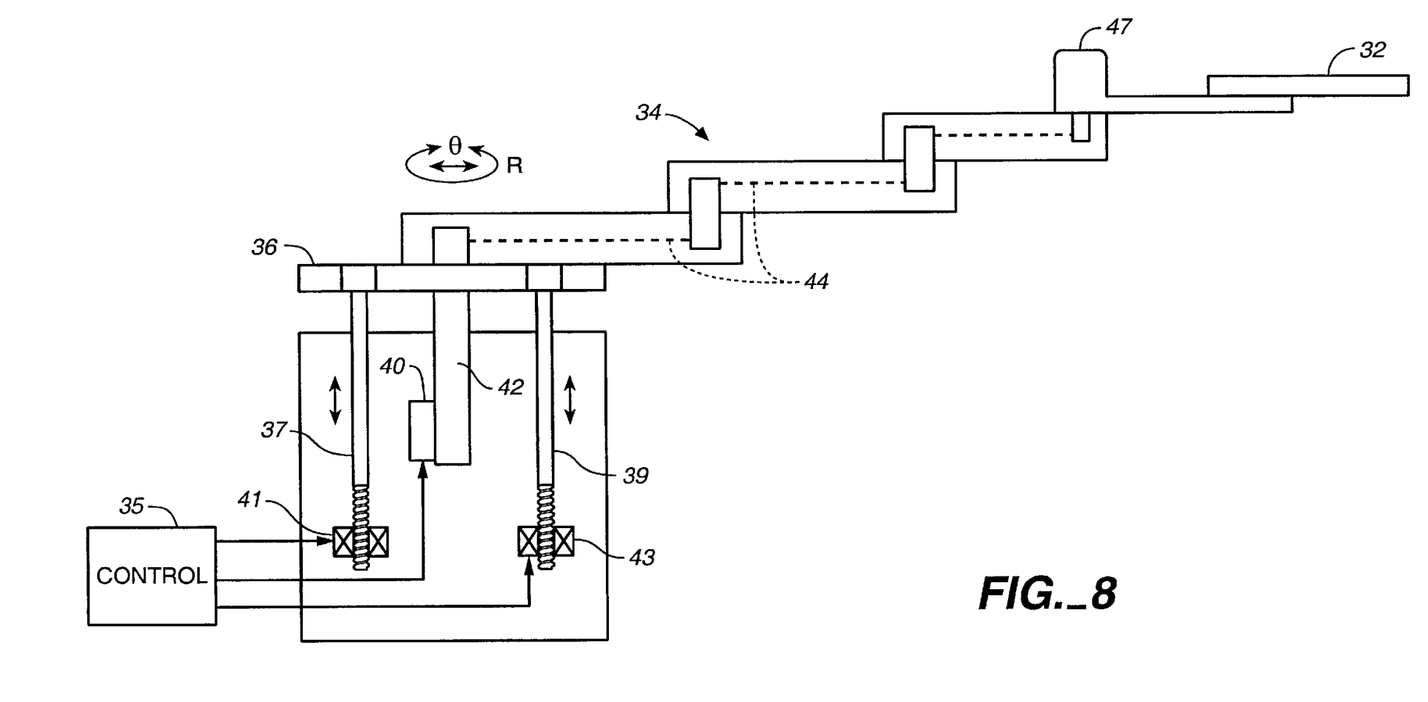
FIG. 8 is a schematic illustration showing internal details of a GPR robot.

As can be seen, in order to maintain substrate 32 in a horizontal orientation, arm 34 is necessarily angled at a predetermined compensation angle β compensating for the sag imposed by for example the weight of substrate 32 and the geometry and stiffness of the arm 34. Such a compensation angle is readily achieved in a GPR of the type in which platform 36, supported on three supports (only two of which—37 and 39—are shown), can be tilted by moving the supports in the Z direction at different rates. As illustrated in FIG. 8, such motion is effected using actuation means such as motors 41 and 43 and is controlled by a controller 45 such as for example a suitably programmed microprocessor. Controller 45 also controls planar extension/retraction motion of arm 34 and any other motions contemplated, including yaw, pitch and roll motions. Controller 45 operates by issuing control signals to actuation means 40, such as a motor, which operates via an appropriate mechanical linkage system 42, 44 to effect the desired planar extension/retraction motion. Signals to one or more motors (not shown) for independently moving the end effector 47 are also issued by the controller 45. For purposes of explanation, the motion of robot arm 34 will be discussed in terms of elevational (Z) motion and planar extension/retraction motion. However, it will be understood that the planar extension/retraction motion may itself engender the various other motions of which the robot arm 34 and end effector 47 are capable as discussed above.

With reference again to FIG. 7, it can be seen that the different positions of substrate 32 in the approach position (31) and the pickup position (31') are due to the different amount of planar extension/retraction motion of robot arm 34 and the different elevational (Z) positions of platform 36, regardless of the tilt angle β, which tilt angle does not necessarily change between the two positions. Hence, during travel of arm 34 between the approach position 31 and the pickup position 31', synchronization of the planar extension/retraction motion of the arm 34 with the elevational motion of platform 36 on which arm 34 is mounted serves to preserve both the orientation of the substrate 32 and its planar position. In other words, in moving between the pickup and approach positions, substrate 32 is made to travel along a trajectory which is at least partially coincident with its object axis P by imparting to arm 34 both planar motion and elevational motion and by synchronizing these two imparted motions. The synchronization can be in the form of a linear interpolation between the approach and pickup positions of the robot using the coordinates of the end effector 47 at and between these positions along the travel trajectory. In the particular example of FIG. 7, both the travel trajectory and the object axis P are horizontal, although this will not necessarily always be the case. The synchronization can be effected by control means 45 issuing appropriate signals to actuation means 40, 41 and 43 and other means associated with the arm motion, including the end effector 47 and its associated motor or motors (not shown).

In GPR robots such as that illustrated in FIG. 6–8, platform 36 is supported on a compound Z axis support having three support members (only two, 37 and 39, are shown). As discussed, platform 36 is independently actuatable along these Z-axis supports to achieve any desired tilt within a prescribed range of tilt angles. The particular Z position of the platform is defined by the three Z-axis coordinates (Z1,Z2,Z3). At pickup, the elevational position of platform 36 is defined by Z coordinates ($Z1_{pu}, Z2_{pu}, Z3_{pu}$), while at approach, the position is defined by Z coordinates ($Z1_{appr}, Z2_{appr}, Z3_{appr}$). The pickup position differs from the approach position along the Z axes by the amount dZ=(dZ1, dZ2,dZ3), wherin $dZ1=Z1_{pu}-Z1_{appr}$, $dZ2=Z2_{pu}-Z2_{appr}$ and $dZ3=Z3_{pu}-Z3_{appr}$. In the arrangement of FIG. 7, dZ1, dZ2 and dZ3 are equal (dZ1=dZ2=dZ3) such that the angle of platform 36 is the same in both positions. However, as discussed below, this will not necessarily always be the case.

The synchronization of the Z motion with the arm 34 planar extension/retraction motion can be achieved using algorithms developed by controller 45 analytically or experimentally. In the analytical approach, the mechanical properties—that is, the geometry, stiffness and weight, for example—of arm 34 and substrate 32 are all taken into account to calculate the relative Z-axis and planar extension/retraction motions necessary to maintain the proper orientations and movement directions in a relatively straightforward manner. From this data motion control algorithms are developed which guide the trajectory of robot arm 34 using controller 45 to issue the necessary control signals to the different arm actuation mechanisms.

In the experimental approach, the pickup and approach positions are individually taught, during an initial learning mode, for example for each cassette and/or processing station. As an example, teaching of the robot may be implemented to guarantee that the substrate 32 is in the middle of the slot at the pickup position and its front edges are in the middle of the slot entrance at the approach position. This procedure automatically accounts for the compound deflection of the arm 34, the end effector 47, and the substrate 32, as well as for the inaccuracies of the arm 34. Again, from this data appropriate motion control algorithms are developed for implementing the necessary motions of the robot arm 34 using controller 45 to issue the appropriate commands to the actuation mechanisms. Of course those skilled in the art will appreciate that movement in a single straight line, along radial trajectories, non-radial multi-segment trajectories and non-radial trajectories with compound velocity profiles all fall within the purview of the invention.

From the above, it can be seen that compensation in accordance with the invention consists of correction for the orientation of the object at two characteristic positions—approach and pick up—and synchronous motion of all robot axes between these two positions. Tilt motion is such a motion, and provided that the robot is at the pickup position of a particular station, the robot needs to rotate the object/end-effector around the object's characteristic point (i.e., "center") in order to compensate for imperfection in the station orientation. To accomplish this, this task requires at least six degrees of freedom. A GPR robot is particularly well-suited for providing these six degrees of freedom in the semiconductor processing context because of the light weight manner in which end effector manipulation can be achieved and because of the high accuracy and increased payload of which it is capable due to its characteristic hybrid nature. This hybrid nature of the GPR derives from the fact that the GPR is considered to be a series-parallel device, with the parallel component being the three Z-axis robot elevators and with the serial component being the extensible arm having the planar motion prescribed by radial and angular motions. Each of these components imparts certain operational advantages, and together, a handling device optimized for the semiconductor processing environment is realized. Specifically, GPR robots combine the advantages of parallel and serial manipulators by providing fast global (over a large working area) motion using a simple planar (T,R,Y) serial-arm and accurate tilting motion through the parallel mechanical structure that supports the robotic arm.

The hybrid nature of GPR robots, however, imposes unique kinematics requirements which are specific to the mechanical characteristics of the device. Accordingly, deflection compensation for tilt motion, which comprises rotation of the end-effector around one or more axes in order to compensate for imperfection in station orientation for example, includes calculation of the position and the orientation of the end-effector based on the current position of the motors of the GPR (generalized coordinates), using encoders whose outputs are related to the motor positions. The calculations are referred to as the direct kinematics and their solution is necessary in order to determine the position of the coordinate frame firmly affixed to the object. Then, after determining the position of the coordinate frame by solving the direct kinematics, the robot implements rotation of the object/end-effector around a selected axis of this coordinate frame to arrive at a desired orientation. This desired orientation is associated with general robot position coordinates which are then determined by solving inverse kinematics equations. In effect, the inverse kinematic equations relate back to the general robot position.

After performing the above calculations and motions, the object/end-effector is moved from the approach to the pick-up positions. This motion involves both tilting and translation, which are also effected by performing the calculations involving the direct kinematics and inverse kinematics in a manner analogous to that previously described. During robot motions, a comparison of the solutions of the inverse kinematics and the direct kinematics can be used to ascertain that proper motion and trajectories have been followed. The motion between the approach and pick-up positions can be coordinated such that the two motions are synchronized in order to realize some of the advantages of the present invention.

Figure 9:
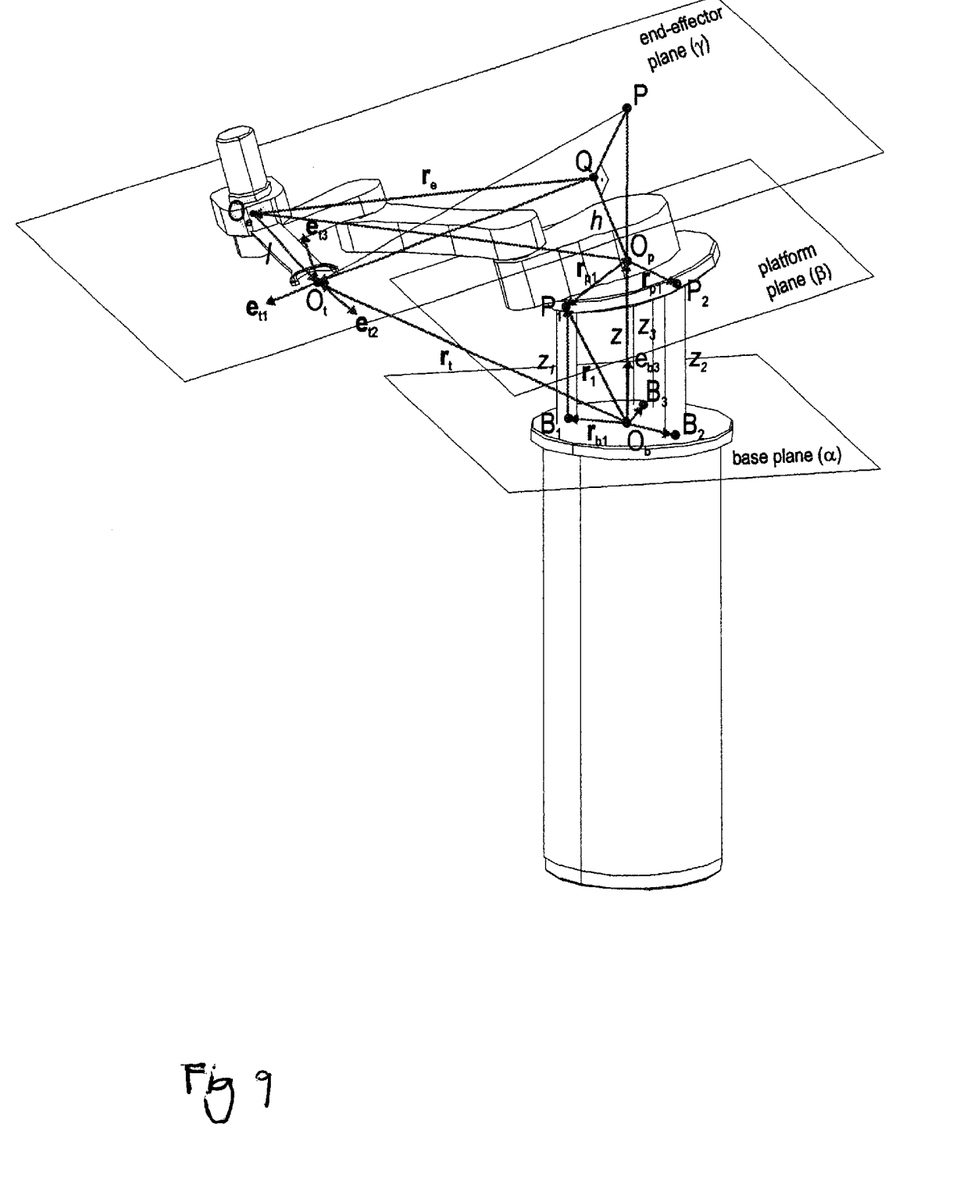
FIG. 9 is a schematic diagram illustrating the various computational principles involved in accordance with the invention.

Solving the direct kinematics problem is explained with reference to FIG. 9 and involves the following:

Direct Kinematics

Given: The generalized coordinates of the robot $z_1$, $z_1$, $z_1$, $\Theta_1$, $\Theta_2$, $\Theta_3$ Find: The position of the characteristic point of the end-effector $r_t^{(b)}$ and its orientation $R^{tb}$ The position of the poles of the spherical bearings at the platform can be calculated as follows:

$$r_i = \overrightarrow{O_b P_i} = r_{bi} - z_i e_{b3}, \quad i=1,2,3.$$

Then the radius-vector of the center point of the platform can be represented as $$r_b = \tfrac{1}{3}(r_1 + r_2 + r_3).$$

The unit vectors of the coordinate frame firmly attached to the platform a given by $$e_{p1} = \frac{r_1 - r_b}{\|r_1 - r_b\|}$$

$$e_{p3} = \frac{r_{13} - r_{12}}{\|r_{13} - r_{12}\|}$$

$$e_{p2} = e_{p3} \times e_{p1}$$

where $$r_{12} = r_2 - r_1 \text{ and } r_{13} = r_3 - r_1$$

The position of the characteristic point of the end-effector $r_t^{(b)}$ with respect to the absolute (base) coordinate frame $O_b e_{b1} e_{b2} e_{b2}$ can be calculated according to the formula $$r_t^{(b)} = r_b^{(b)} + R^{pb} r_{Pt}^{(b)},$$

where $$r_{Pt}^{(p)} = [r_{Pt_1}^{(p)} r_{Pt_2}^{(p)} h]^T,$$

$$r_{Pt_1}^{(p)} = 2a[\cos(\Theta_1) + \cos(\Theta_1 + \Theta_2)] + l \cos(\Theta_1 + \Theta_2 + \Theta_3)$$

$$r_{Pt_2}^{(p)} = 2a[\sin(\Theta_1) + \sin(\Theta_1 + \Theta_2)] + l \sin(\Theta_1 + \Theta_2 + \Theta_3),$$

and a and l stand for the length of the first link of the robot-arm and the length of the end-effector respectively. Finally, the orientation of the end effector can be represented by the orthogonal unit vectors $$e_{t2}^{(p)} = [\cos(\Theta_1 \Theta_2 + \Theta_3) \sin(\Theta_1 + \Theta_2 + \Theta_3) 0]^T$$

$$e_{t2}^{(b)} = R^{pb} e_{t2}^{(p)}$$

$$e_{t3}^{(b)} = e_{p3}^{(b)}$$

$$e_{t1}^{(b)} = (e_{t2} \times e_{t3})^{(b)}$$

Solving the inverse kinematics problem involves the following:

Inverse Kinematics

Given: The position of the characteristic point of the end-effector $r_t$ and its orientation represented by the transformation matrix $R^{tb} = [e_{t1} \ e_{t2} \ e_{t3}]$ Find: The generalized coordinates of the robot $z_1$, $z_2$, $z_3$, $\Theta_1$, $\Theta_2$, $\Theta_3$ In order to calculate the position of the center of the platform with respect to the absolute (base) coordinate frame $O_b e_{b1} e_{b2} e_{b2}$ we calculate the intersection point of the axis $O_b P e_{b3}$ and the end-effector plane represented by the equation $$e_{t3} \cdot (r - r_t) = 0.$$

Direct substitution of the coordinates of the point P into the above equation gives:

$$e_{t3} \cdot (O_b P e_{b3} - r_t) = 0$$

and $$O_b P = e_{t3} \cdot r_t / e_{b3} \cdot e_{t3}$$

Consider that $$O_p P = \frac{h}{e_{b3} \cdot e_{t3}},$$

where $h = O_p Q$ is the height of the robot-arm, the distance between the characteristic poles of the base and the platform can be calculated as $$z = O_b O_p = \frac{e_{t3} \cdot r_t - h}{e_{b3} \cdot e_{t3}}.$$

The generalized coordinates $z_1$, $z_2$, $z_3$, which represent the length of the rods connecting the base and the platform, are given by $$z_1 = O_{bi} O_{pi} = z - \frac{e_{t3} \cdot r_{bi}}{e_{b3} \cdot e_{t3}},$$

where $$r_{bi} = \overrightarrow{O_b B_i} \text{ and } i=1, 2, 3$$

The unit-vectors of the coordinate fame of the platform can be calculated according to the formulae $$e_{p1} = r_{p1} / \|r_{p1}\|,$$

$$e_{p3} = e_{t3},$$

$$e_{p2} = e_{p3} \times e_{p1},$$

where $$r_{p1} = \overrightarrow{O_p P_1} = (z_1 - z) e_{b3} + r_{b1}.$$

The generalized coordinates (joint-angles) of the robot-arm can be calculated according to the following expressions:

$$r_e = \overrightarrow{QO}_e = r_t - l e_{t2} - z e_{b3} - h e_{t3}$$

$$R^{tb} = [e_{t1}^{(b)} \ e_{t2}^{(b)} \ e_{t3}^{(b)}]$$

$$r_e^{(p)} = (R^{tb})^T r_e^{(p)} = [r_{e1}^{(p)} \ r_{e2}^{(p)} \ 0]^T$$

$$\Theta 1 = a \tan \frac{r_{e2}^{(p)}}{r_{e1}^{(p)}} + a \cos \frac{\sqrt{(r_{e1}^{(p)})^2 + (r_{e2}^{(p)})^2}}{4a}$$

$$\Theta 2 = \frac{3\Pi}{2} - a \cos \frac{\sqrt{(r_{e1}^{(p)})^2 + (r_{e2}^{(p)})^2}}{4a}$$

$$\Theta 3 = 2\Pi - a \tan \frac{r_{e2}^{(p)}}{r_{e1}^{(p)}} - a \cos \frac{\sqrt{(r_{e1}^{(p)})^2 + (r_{e2}^{(p)})^2}}{4a} + a \cos(e_{p1} \cdot e_{t2})$$

After the above have been performed, synchronous motion between the approach and pickup positions is implemented to thereby realize the compensated, synchronized robot arm approach of the invention.

The above are exemplary modes of carrying out the invention and are not intended to be limiting. It will be apparent to those skilled in the art that modifications thereto can be made without departure from the spirit and scope of the invention as set forth in the following claims.

What is claimed is:

1. In a robot having two or more degrees of freedom and a robot arm motivated by one or more motors and adapted to transport an object bidirectionally between approach and pickup positions, a method for transporting the object comprising:
   supporting the object at an initial approach position using the robot arm;
   determining the position of the motors corresponding to the initial approach position;
   determining the generalized coordinates of the robot corresponding to the initial approach position based on the determined position of the motors corresponding to the initial approach position;
   supporting the object at a desired pickup position using the robot arm;
   determining the position of the motors corresponding to the desired pickup position;
   determining the generalized coordinates of the robot corresponding to the desired pickup position based on the determined position of the motors corresponding to the desired pickup position; and
   moving the object between the initial approach position to the pickup position,
   wherein the object has an object axis and wherein the step of moving comprises synchronizing planar and elevational motions of the object such that the object travels between the desired approach position and the pickup position along a path at least partially coincident with the object axis,
   wherein the step of synchronizing comprises:
      developing, during a learning mode, one or more motion control algorithms for guiding the robot arm along associated predetermined trajectories which comprise one or more radial trajectories, non-radial multi-segment trajectories, or non-radial trajectories with compound velocity profiles, said developing comprising analytically calculating planar and elevational velocity profiles for predetermined object and robot geometry, stiffness and weight; and
      using the one or more control algorithms to guide the motion of the robot arm between the desired approach and pickup positions.

2. In a robot having two or more degrees of freedom and a robot arm actuated by one or more motors and adapted to transport an object between approach and pickup positions, a method for determining the path of the object comprising:
   supporting the object at the approach position using the robot arm;
   determining the position of the motors corresponding to the approach position;
   performing a set of one or more direct kinematics calculations relating the position of the motors corresponding to the initial approach position to the position of the object at the approach position;
   supporting the object at the pickup position using the robot arm;
   determining the position of the motors corresponding to the pickup position;
   performing a set of one or more direct kinematics calculations relating the position of the motors corresponding to the pickup position to the position of the object at the pickup position, wherein each set of one or more inverse kinematics calculations corresponds to a desired set of motor positions;
   performing, for each desired set of motor positions, a corresponding set of one or more direct kinematics calculations to thereby obtain a desired object position and orientation;
   performing a set of one or more inverse kinematics calculations associated with a trajectory of the object between the pickup position and the initial approach position;
   moving the object between the approach and pickup positions through a set of actual object positions and orientations;
   comparing motor positions corresponding to the actual set of positions and orientations with motor positions corresponding to desired object positions and orientations; and
   minimizing the difference between the compared motor positions.

3. A computer-readable medium for use in controlling a robot having two or more degrees of freedom and a robot arm actuated by one or more motors and adapted to transport an object between an approach and a pickup position through a set of actual object positions, the medium containing a program which executes the following procedure:
   determining the position of the motors corresponding to the approach position;
   performing a set of one or more direct kinematics calculations relating the determined position of the motors corresponding to the initial approach position to the position of the object at the approach position;
   determining the position of the motors corresponding to the pickup position;
   performing a set of one or more direct kinematics calculations relating the determined position of the motors corresponding to the pickup position to the position of the object at the pickup position; and
   performing a set of one or more inverse kinematics calculations associated with a trajectory of the object between the approach position and the pickup position,
   wherein each set of one or more inverse kinematics calculations corresponds to a desired set of motor positions, the program further executing the steps of:
      performing, for each desired set of motor positions, a corresponding set of one or more direct kinematics calculations to thereby obtain a desired object position; and
      comparing motor positions corresponding to sets of actual object positions with motor positions corresponding to desired object positions; and
      minimizing the differences between the compared motor positions.

4. In a robot having two or more degrees of freedom and a robot arm actuated by one or more motors and adapted to transport an object between approach and pickup positions, a method for moving the object comprising:
   supporting the object at the approach position using the robot arm;
   determining the position of the motors corresponding to the approach position of the object;
   performing direct kinematics calculations relating the position of the motors corresponding to the approach position of the object to the position of the object;

supporting the object at the pickup position using the robot arm;

determining the position of the motors corresponding to the pickup position of the object;

performing direct kinematics calculations relating the position of the motors corresponding to the pickup position of the object to the position of the object;

using results of the direct kinematics calculations to generate a set of intermediate points along a trajectory of the object between the approach and pickup positions;

generating inverse kinematics calculations which resolve the intermediate points to intermediate motor positions; and moving the object between the approach and pickup positions in accordance with the intermediate motor positions.

5. In a robot having two or more degrees of freedom and a robot arm actuated by one or more motors and adapted to transport an object between approach and pickup positions, a method for determining the path of the object comprising:

supporting the object at the approach position using the robot arm;

determining the position of the motors corresponding to the approach position;

performing a set of one or more direct kinematics calculations relating the position of the motors corresponding to the initial approach position to the position of the object at the approach position;

supporting the object at the pickup position using the robot arm;

determining the position of the motors corresponding to the pickup position;

performing a set of one or more direct kinematics calculations relating the position of the motors corresponding to the pickup position to the position of the object at the pickup position;

performing a set of one or more inverse kinematics calculations associated with a trajectory of the object between the pickup position and the initial approach position performing, for one or more intermediate motor positions, direct kinematics calculations to thereby obtain desired object positions;

comparing desired object positions with actual object positions along the trajectory of the object between the approach and pickup positions; and minimizing the difference between the desired object positions and the actual object positions along the trajectory of the object between the approach and pickup positions.

6. The method of claim 4, wherein the robot is a global positioning robot.

7. The method of claim 4, wherein the object is an end effector of the robot.

8. A computer-readable medium for use in controlling a robot having two or more degrees of freedom and a robot arm actuated by one or more motors and adapted to transport an object between approach and pickup positions, the medium containing a program which executes the following procedure:

determining the position of the motors corresponding to the approach position of the object;

performing direct kinematics calculations relating the position of the motors corresponding to the approach position of the object to the position of the object;

determining the position of the motors corresponding to the pickup position of the object;

performing direct kinematics calculations relating the position of the motors corresponding to the pickup position of the object to the position of the object;

using results of the direct kinematics calculations to generate a set of intermediate points along a trajectory of the object between the approach and pickup positions;

generating inverse kinematics calculations which resolve the intermediate points to intermediate motor positions; and issue commands to the robot to move the object between the approach and pickup positions in accordance with the intermediate motor positions.

9. The medium of claim 8, wherein said procedure further comprises:

performing, for one or more intermediate motor positions, direct kinematics calculations to thereby obtain desired object positions;

comparing desired object positions with actual object positions along the trajectory of the object between the approach and pickup positions; and minimizing the difference between the desired object positions and the actual object positions along the trajectory of the object between the approach and pickup positions.

10. The medium of claim 8, wherein the robot is a global positioning robot.

11. The medium of claim 8, wherein the object is an end effector of the robot.

12. The method of claim 4, further comprising:

performing, for one or more intermediate motor positions, direct kinematics calculations to thereby obtain desired object positions;

comparing desired object positions with actual object positions along the trajectory of the object between the approach and pickup positions; and minimizing the difference between the desired object positions and the actual object positions along the trajectory of the object between the approach and pickup positions.

* * * * *